(12) United States Patent
Zimmel et al.

(10) Patent No.: US 11,150,412 B2
(45) Date of Patent: Oct. 19, 2021

(54) TUNABLE FIBER OPTIC CONNECTORS

(71) Applicant: COMMSCOPE TECHNOLOGIES LLC, Hickory, NC (US)

(72) Inventors: Steven Conrad Zimmel, Minneapolis, MN (US); Gregory J. Schaible, Lakeville, MN (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/964,745

(22) PCT Filed: Jan. 31, 2019

(86) PCT No.: PCT/US2019/016004
§ 371 (c)(1),
(2) Date: Jul. 24, 2020

(87) PCT Pub. No.: WO2019/152623
PCT Pub. Date: Aug. 8, 2019

(65) Prior Publication Data
US 2021/0033796 A1  Feb. 4, 2021

Related U.S. Application Data

(60) Provisional application No. 62/624,466, filed on Jan. 31, 2018.

(51) Int. Cl.
*G02B 6/36* (2006.01)
*G02B 6/38* (2006.01)

(52) U.S. Cl.
CPC ......... *G02B 6/3656* (2013.01); *G02B 6/3821* (2013.01); *G02B 6/3843* (2013.01); *G02B 6/3851* (2013.01)

(58) Field of Classification Search
None
See application file for complete search history.

(56) References Cited

U.S. PATENT DOCUMENTS

| | | | |
|---|---|---|---|
| 3,800,388 A | 4/1974 | Bomer et al. | |
| 4,019,806 A | 4/1977 | Fellows et al. | |

(Continued)

FOREIGN PATENT DOCUMENTS

| | | |
|---|---|---|
| EP | 1 067 415 A2 | 1/2001 |
| EP | 1 072 914 A2 | 1/2001 |
| JP | H03-84801 U | 8/1991 |

OTHER PUBLICATIONS

International Search Report and Written Opinion of the International Searching Authority for International Patent Application No. PCT/US2019/016004 dated Apr. 30, 2019, 11 pages.

(Continued)

*Primary Examiner* — Ryan A Lepisto
*Assistant Examiner* — Erin D Chiem
(74) *Attorney, Agent, or Firm* — Merchant & Gould P.C.

(57) ABSTRACT

Fiber optic connectors, connector assemblies, and associated methods having tuning features and aspects. The tuning features/aspects allow for a tuning mechanism of a rear housing to be moved axially between an anti-rotation region and a tuning chamber defined by a front housing. The rear housing is rotationally coupled to a ferrule assembly for tuning an optical fiber terminated at the ferrule assembly.

24 Claims, 12 Drawing Sheets

(56) References Cited

U.S. PATENT DOCUMENTS

| | | | |
|---|---|---|---|
| 4,113,346 A | 9/1978 | Jackson et al. | |
| 4,146,300 A | 3/1979 | Kaiser | |
| 4,239,333 A | 12/1980 | Dakss et al. | |
| 4,474,659 A | 10/1984 | Fazlin | |
| 4,579,418 A | 4/1986 | Parchet et al. | |
| 4,738,507 A | 4/1988 | Palmquist | |
| 4,738,508 A | 4/1988 | Palmquist | |
| 4,753,510 A | 6/1988 | Sezerman | |
| 4,792,205 A | 12/1988 | Yin et al. | |
| 4,856,865 A | 8/1989 | Lee | |
| 4,881,792 A | 11/1989 | Alameel et al. | |
| 5,096,276 A | 3/1992 | Gerace et al. | |
| 5,142,598 A | 8/1992 | Tabone | |
| 5,146,525 A | 9/1992 | Tabone | |
| 5,212,752 A * | 5/1993 | Stephenson | G02B 6/3831 385/78 |
| 5,212,753 A | 5/1993 | Maranto | |
| 5,222,169 A | 6/1993 | Chang et al. | |
| 5,282,259 A | 1/1994 | Grois et al. | |
| 5,317,663 A | 5/1994 | Beard et al. | |
| 5,384,885 A | 1/1995 | Diner | |
| 5,390,269 A | 2/1995 | Palecek et al. | |
| 5,633,970 A | 5/1997 | Olson et al. | |
| 5,682,451 A | 10/1997 | Lee et al. | |
| 5,809,192 A | 9/1998 | Manning et al. | |
| 5,852,694 A | 12/1998 | Kimura et al. | |
| 5,946,436 A | 8/1999 | Takashi | |
| 5,963,691 A | 10/1999 | Bunin et al. | |
| 6,142,676 A | 11/2000 | Lu | |
| 6,155,146 A | 12/2000 | Andrews et al. | |
| RE37,079 E | 3/2001 | Stephenson et al. | |
| RE37,080 E | 3/2001 | Stephenson et al. | |
| 6,206,581 B1 | 3/2001 | Driscoll et al. | |
| 6,210,045 B1 | 4/2001 | Dean, Jr. et al. | |
| 6,227,721 B1 | 5/2001 | Naito et al. | |
| 6,238,101 B1 | 5/2001 | Chen et al. | |
| 6,428,215 B1 | 8/2002 | Nault | |
| 6,629,782 B2 | 10/2003 | McPhee et al. | |
| 6,655,851 B1 | 12/2003 | Lee | |
| 6,695,489 B2 | 2/2004 | Nault | |
| 6,913,396 B2 | 7/2005 | Nelson | |
| 6,916,120 B2 | 7/2005 | Zimmel | |
| 6,918,816 B2 | 7/2005 | Bianchi | |
| 7,147,385 B2 | 12/2006 | Zimmel et al. | |
| 7,163,440 B2 | 1/2007 | Bianchi | |
| 7,201,518 B2 | 4/2007 | Holmquist | |
| 7,341,382 B2 | 3/2008 | Dye | |
| 7,371,082 B2 | 5/2008 | Zimmel et al. | |
| 7,530,745 B2 | 5/2009 | Holmquist | |
| 7,891,883 B2 | 2/2011 | Zimmel et al. | |
| 9,081,154 B2 | 7/2015 | Zimmel et al. | |
| 10,168,489 B2 | 1/2019 | Zimmel et al. | |
| 10,663,675 B2 | 5/2020 | Zimmel et al. | |
| 2003/0215190 A1 | 11/2003 | Lampert et al. | |
| 2004/0151437 A1 | 8/2004 | Marrs et al. | |
| 2005/0232554 A1 | 10/2005 | Zimmel et al. | |
| 2018/0003902 A1 | 1/2018 | Rosson et al. | |
| 2020/0096705 A1 * | 3/2020 | Rosson | G02B 6/3873 |

OTHER PUBLICATIONS

"Assembly Instructions for LCTM Fiber Optic Behind-The-Wall (BTW) Connectors: Epoxy and EZ Methods Singlemodz and Multimode Versions", Lucent Technologies, Bell Labs Innovations, 640-252-053, Internal No. 847 953 205, 3: 1-37 (Jul. 1999).

* cited by examiner

TUNABLE FIBER OPTIC CONNECTORS

CROSS-REFERENCE TO RELATED APPLICATION

This application is a National Stage Application of PCT/US2019/016004, filed on Jan. 31, 2019, which claims the benefit of U.S. Patent Application Ser. No. 62/624,466, filed on Jan. 31, 2018, the disclosures of which are incorporated herein by reference in their entireties. To the extent appropriate, a claim of priority is made to each of the above disclosed applications.

BACKGROUND

Fiber optic cables are used in the telecommunication industry to transmit light signals in high-speed data and communication systems. A standard fiber optic cable includes a fiber with an inner light transmitting optical core. Surrounding the fiber is an outer protective casing.

A fiber terminates at a fiber optic connector. Connectors are frequently used to non-permanently connect and disconnect optical elements in a fiber optic transmission system. There are many different fiber optic connector types. Some of the more common connectors are FC and SC connectors. Other types of connectors include ST and D4-type connectors.

A typical SC fiber optic connector includes a housing having a front end positioned opposite from a rear end. The front end of the SC connector housing is commonly configured to be inserted within an adapter. An example adapter is shown in U.S. Pat. No. 5,317,663. The SC connector typically further includes a ferrule that is positioned within the front and rear ends of the housing, and adjacent the front end. The ferrule is axially moveable relative to the housing, and is spring biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers. Another connector and mating adapter is shown in U.S. Pat. No. 6,142,676.

Signal losses within a system often occur within the connection between two optical fiber cores. Due to manufacturing tolerances of the ferrule outer diameter to inner diameter concentricity, ferrule inner diameter hole size and fiber outer diameter, and fiber core to fiber outer diameter concentricity, when the fiber is inserted into the ferrule the core of a fiber may not and typically does not end up perfectly centered relative to the ferrule outer diameter. If one or both of the fibers are off center, when they are connected within an adapter, the fibers will not be aligned and thus there will be a signal loss when the signal is transmitted between the two fibers. It is therefore desirable to tune a connector to minimize this signal loss. Tuning can be accomplished by measuring signal characteristics through the connector and/or examining physical properties of the connector, and then determining the optimal position of the ferrule and fiber in the connector. Methods of tuning fiber optic connectors are described in U.S. Pat. No. 9,081,154, the contents of which are fully incorporated herein by reference.

SUMMARY

In general terms, the present disclosure is directed to tunable fiber optic connectors and, more specifically, to fiber optic connectors that are tunable prior to completing the connector's assembly. In some examples, once fully assembled, the connector is permanently tuned, i.e., it cannot be de-tuned or re-tuned. In other examples, once fully assembled, the connector can be de-tuned or re-tuned after first partially disassembling the assembled connector.

Features of the disclosed connector will be described with specific reference to an SC form factor connector. Thus, in some examples, the connectors of the present disclosure meet some or all TIA FOCIS 3 standards governing SC connectors such as, e.g., interface dimension standards, ferrule standards, keying standards, etc. However, principles and features of the connectors disclosed herein are not limited to SC connectors, and can be applied to other connector form factors, whether commercially practiced now or in the future.

Connectors in accordance with the present disclosure can be "splice on" connectors in which the fiber is spliced to a fiber stub pre-installed in the connector housing. According to some of these examples, the splice can be housed in a splice volume defined by the connector. Alternatively, a splice can be provided outside the connector. Connectors in accordance with the present disclosure need not be "splice on." For example, an optical fiber can be terminated and processed in the connector without being spliced.

The optical fiber/fiber stub can be coupled to the ferrule of the connector in any suitable way. For example, the fiber/stub can be inserted into a pre-formed axial bore of the ferrule and secured therein, e.g., with adhesive. Alternatively, the ferrule can be over-molded directly onto the fiber/stub or otherwise affixed thereto, e.g., with thermally expandable/compressible materials.

According to certain aspects of the present disclosure, a fiber optic connector assembly comprises a subassembly extending along a central axis from a front end to a back end of the subassembly, the subassembly having a tunable configuration and a non-tunable configuration and including: a front housing defining an anti-rotation region, a tuning chamber disposed forwards of the anti-rotation region, and a ferrule assembly seat disposed forwards of the tuning chamber; a rear housing operably coupled to the front housing and including a tuning mechanism; and a ferrule assembly rotationally coupled to the rear housing about the central axis, wherein when the subassembly is in the non-tunable configuration the tuning mechanism is positioned within the anti-rotation region and/or the ferrule assembly abuts/engages the ferrule assembly seat, and wherein when the subassembly is in the tunable configuration the tuning mechanism is positioned within the tuning chamber.

Optionally, according to some examples, when the subassembly is in the tunable configuration, the ferrule assembly is also positioned rearwards of its front-most position with respect to the front housing, i.e., the ferrule assembly is unseated from and does not abut/engage the ferrule assembly seat.

According to further aspects of the present disclosure, a fiber optic connector is provided, the connector extending along a central axis from a front end to a back end of the connector, the connector having a tunable configuration and a non-tunable configuration and including: a ferrule assembly; a front housing defining an anti-rotation region, a tuning chamber disposed forwards of the anti-rotation region, and a ferrule assembly seat disposed forwards of the tuning chamber; and a rear housing operably coupled to the front housing and including a tuning mechanism, wherein when the connector is in a non-tunable configuration, the tuning mechanism is positioned within the anti-rotation region and/or the ferrule assembly abuts/engages the ferrule assembly seat, and wherein when the connector is in the tunable configuration, the tuning mechanism is positioned within the tuning chamber.

Optionally, according to some examples, when the connector is in the tunable configuration a ferrule assembly of the connector that is disposed within the front housing of the connector is positioned rearwards of a front-most position of the ferrule assembly with respect to the front housing, i.e., the ferrule assembly is unseated/disengaged from the ferrule assembly seat.

According to further aspects of the present disclosure, a method of tuning a fiber optic connector comprises: providing a first connector subassembly, the first connector subassembly extending axially from a front to a back end including a rear housing slidingly disposed within a front housing and being rotationally coupled with a ferrule assembly; pushing or sliding the rear housing forwards such that a tuning mechanism of the rear housing moves from an anti-rotation region defined by the front housing into a tuning chamber defined by the front housing; rotating the rear housing in the tuning chamber to radially align, to a first radial orientation, one of a plurality of keying elements of the tuning mechanism corresponding to an eccentricity of an optical fiber relative to a bore of the ferrule; and releasing or sliding the rear housing rearwards such that the tuning mechanism returns to the anti-rotation region.

Optionally, in some examples of the foregoing methods, prior to the rotating the rear housing, the method includes pushing or sliding the ferrule assembly rearwards. In some examples, the pushing or sliding of the ferrule assembly and the pushing or sliding of the rear housing is performed simultaneously.

In some examples of the foregoing methods, subsequent to the rotating the rear housing, the method includes releasing or sliding the ferrule assembly forwards such that it abuts a ferrule assembly seat defined by the front housing. In some examples, the releasing or sliding of the ferrule assembly and the releasing or sliding of the rear housing are performed simultaneously.

In some examples of the foregoing methods, the forwards pushing or sliding of the rear housing and/or the rearwards sliding or pushing of the ferrule assembly are against a biasing force of a spring, and the releasing or sliding of the rear housing rearwards and/or the releasing or sliding of the ferrule assembly forwards are performed by a decompression of the spring.

According to further aspects of the present disclosure, a kit for assembling a fiber optic connector extending along a central axis from a front end to a back end includes: a front housing defining an anti-rotation region, and/or a tuning chamber disposed forwards of the anti-rotation region, and/or a ferrule assembly seat disposed forwards of the tuning chamber; and/or a rear housing operably couplable to the front housing and including a tuning mechanism; and/or a ferrule assembly having a ferrule and a ferrule hub and being rotationally couplable to the rear housing about the central axis, the ferrule hub being adapted to forwardly abut/engage the ferrule assembly seat; and/or an optical fiber affixed to an axial bore of the ferrule; and/or a spring axially positionable between the rear housing and the ferrule hub; and/or a gripping member couplable to the front housing in a keyed orientation; and or a crimping ring for crimping an optical cable to the rear housing; and/or a strain relief boot couplable to the rear housing to prevent access to the rear housing.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
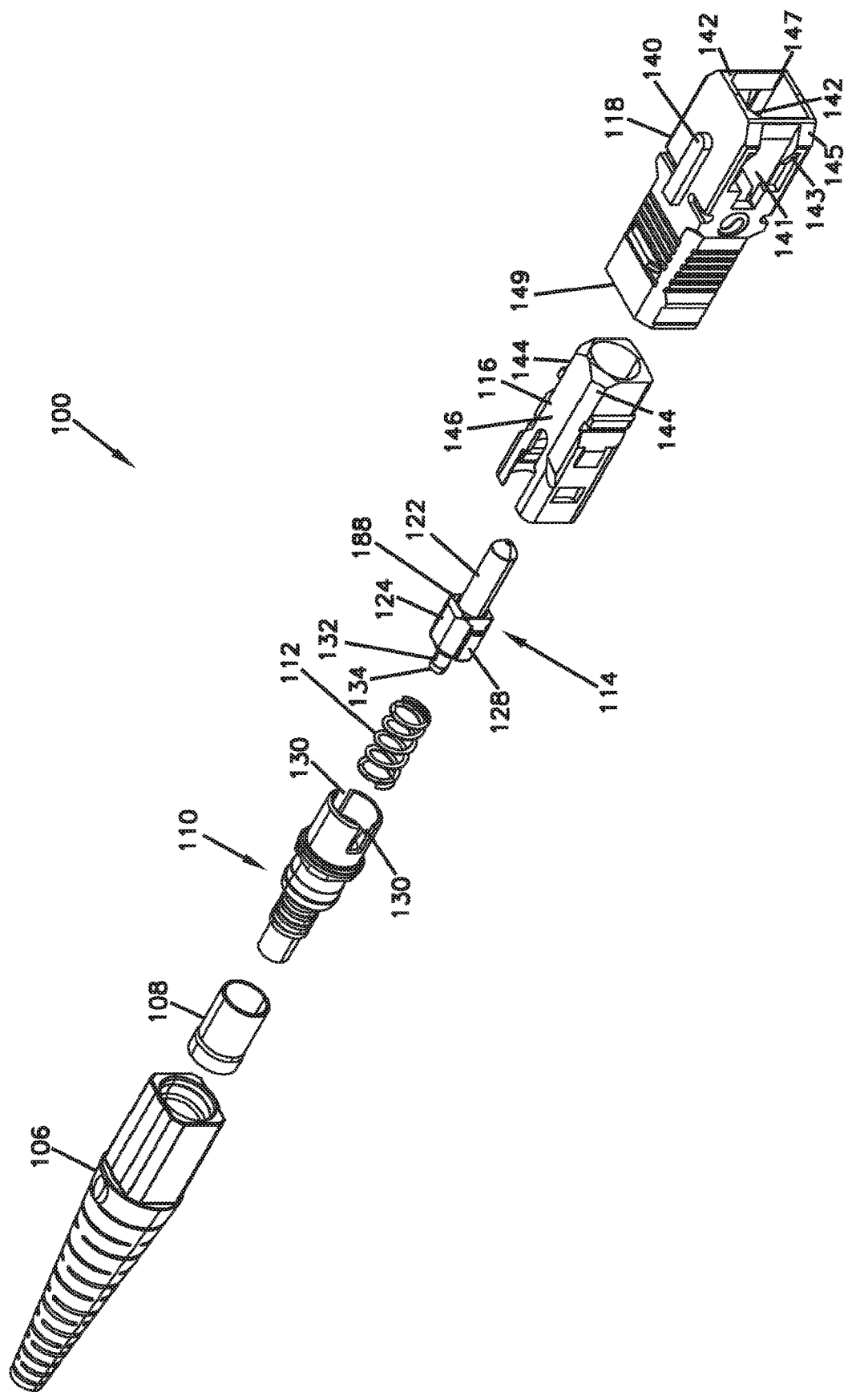
FIG. 1 shows an exploded view of an example fiber optic connector in accordance with the present disclosure.
Figure 2:
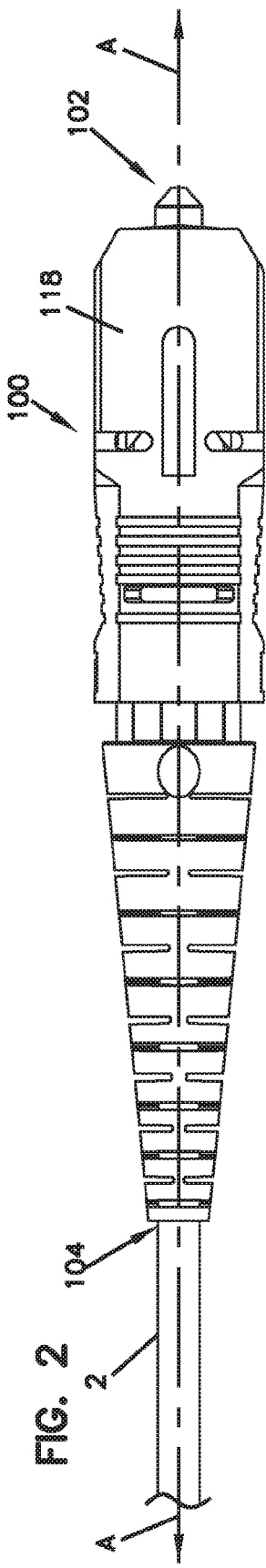
FIG. 2 is a side view of the connector of FIG. 1 in a fully assembled state and including a fiber optic cable that is terminated at the connector.
Figure 3:
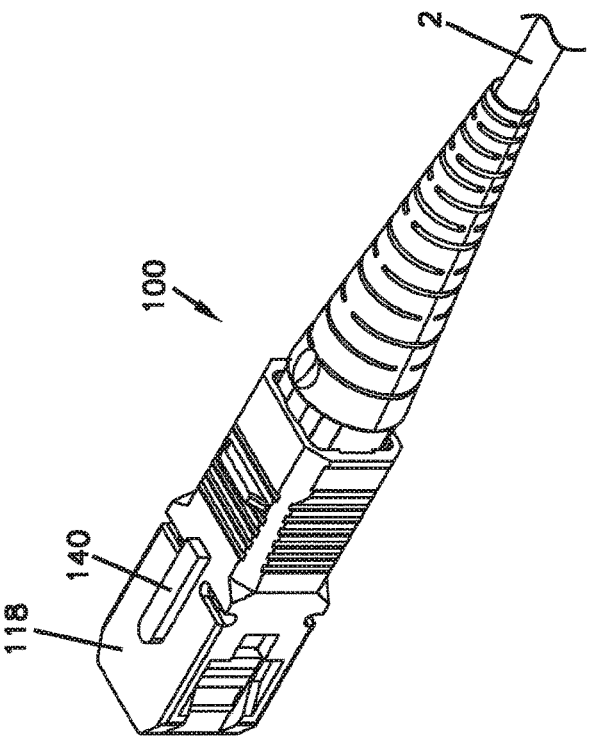
FIG. 3 is a front perspective view of the connector of FIG. 1 in a fully assembled state and including a fiber optic cable that is terminated at the connector.
Figure 4:
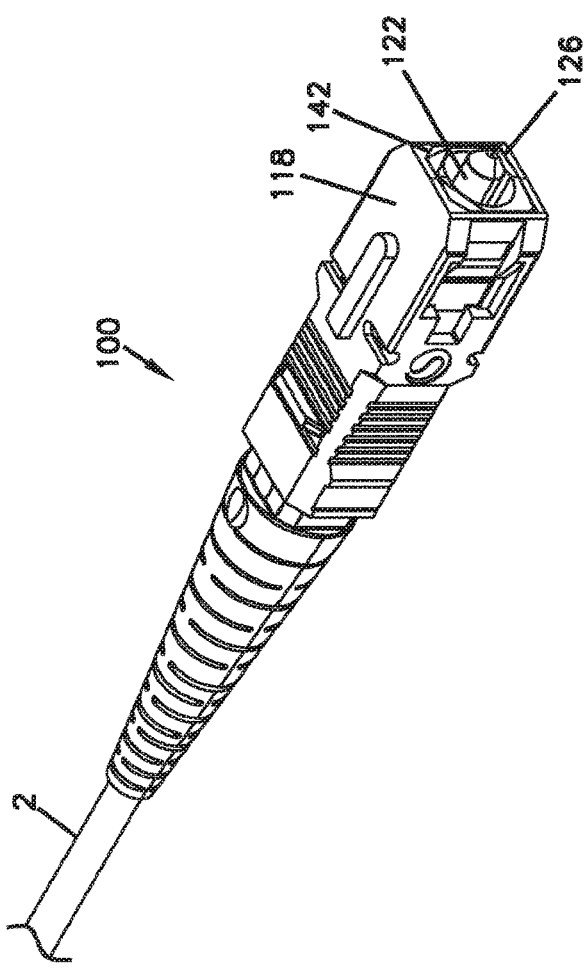
FIG. 4 is a rear perspective view of the connector of FIG. 1 in a fully assembled state and including a fiber optic cable that is terminated at the connector.
Figure 5:
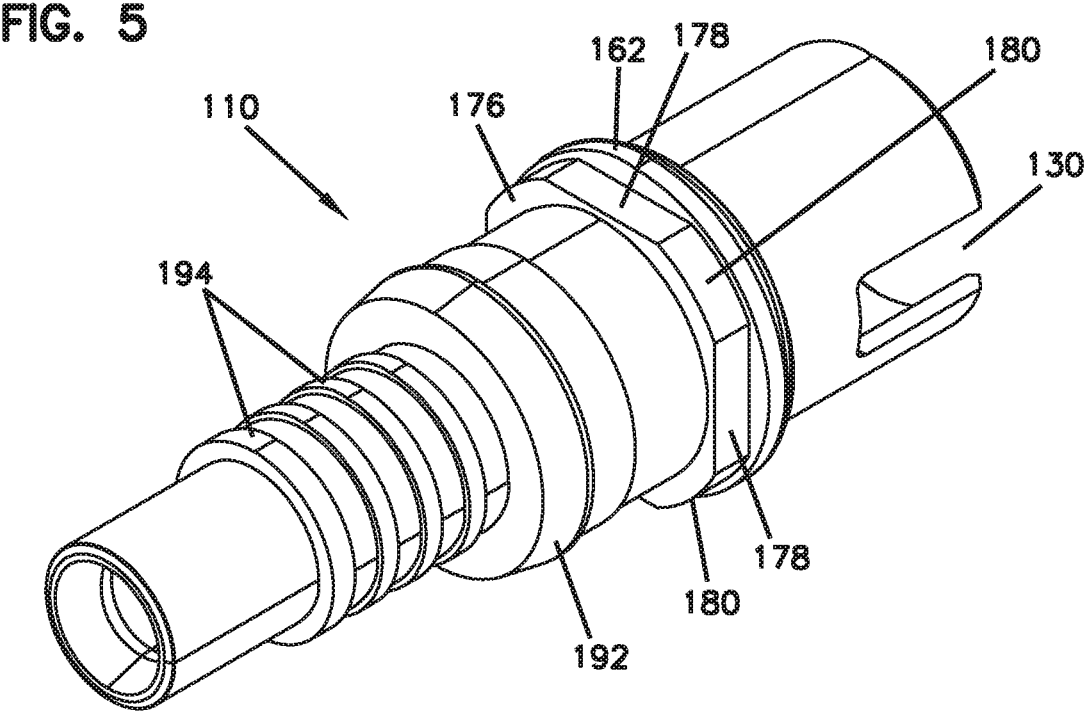
FIG. 5 is a rear perspective view of the rear housing of the connector of FIG. 1.
Figure 6:
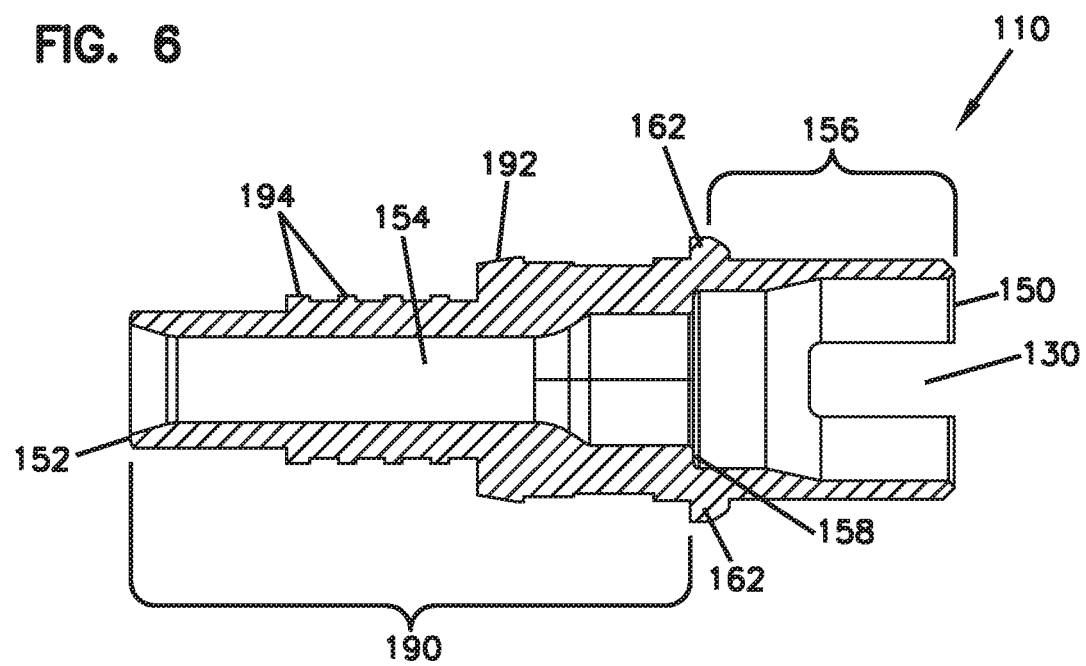
FIG. 6 is an axial cross-sectional view of the rear housing of FIG. 5.
Figure 8:
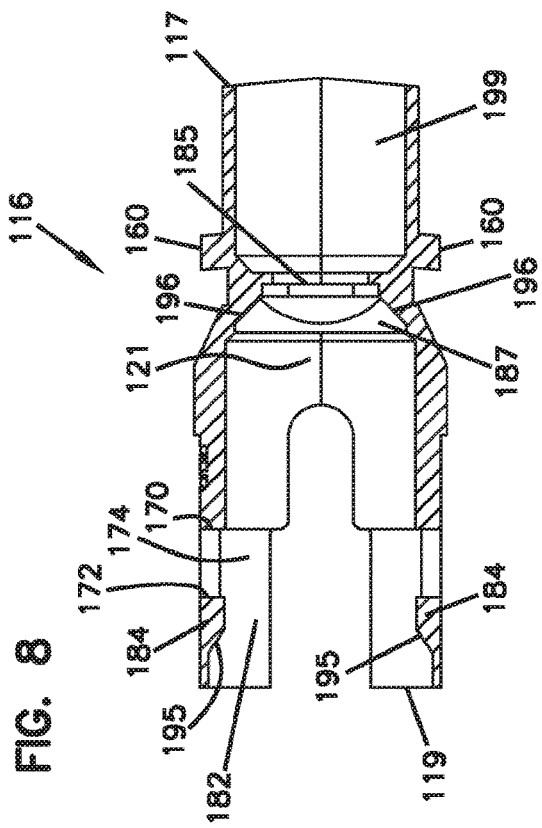
FIG. 8 is an axial cross-sectional view of the front housing of FIG. 7.
Figure 10:
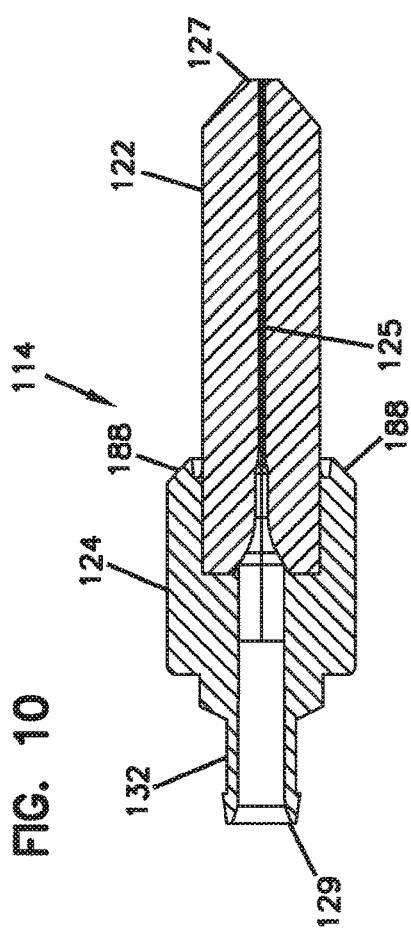
FIG. 10 is an axial cross-sectional view of the ferrule assembly of FIG. 9.
Figure 7:
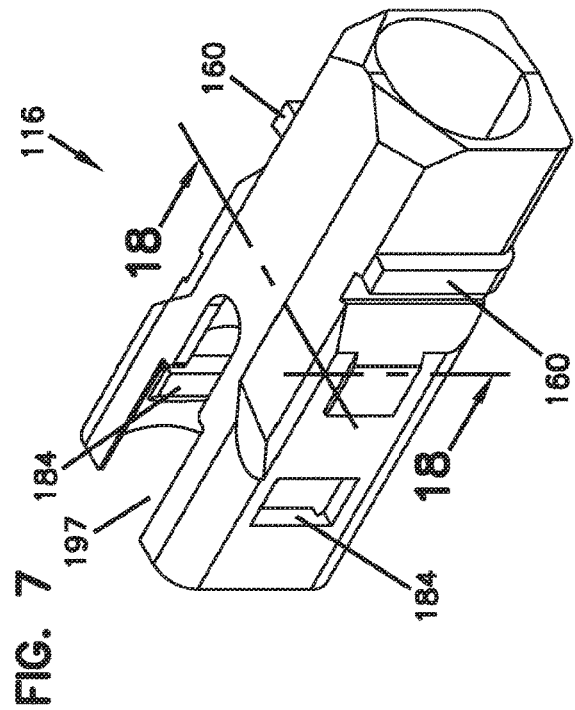
FIG. 7 is a rear perspective view of the front housing of the connector of FIG. 1.
Figure 9:
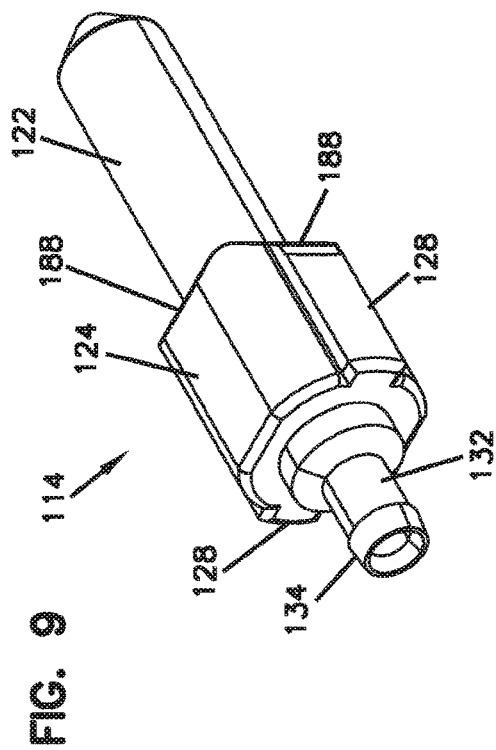
FIG. 9 is a rear perspective view of the ferrule assembly of the connector of FIG. 1.

Reference will now be made in detail to exemplary aspects of the present disclosure that are illustrated in the accompanying drawings. Wherever possible, the same reference numbers will be used throughout the drawings to refer to the same or like parts.

Referring to FIGS. 1-10 and 18, a fiber optic connector 100 and its component parts in accordance with the present disclosure is shown. The connector 100 is defined by a central axis A which generally coincides with or is parallel to an optical fiber extending from the cable 2 or spliced to an optical fiber of the cable 2. In the assembled configuration shown in FIGS. 2-4, the connector 100 extends axially from a front end 102 to a rear end 104.

The connector 100 includes a boot 106, a crimp ring 108, a rear housing 110, a spring 112, a ferrule assembly 114, a front housing 116, and a gripping member 118.

The ferrule assembly 114 extends axially from a front 127 to a back 129 and includes a ferrule 122 affixed to and extending forwardly from a ferrule hub 124. The ferrule 122 has a front end face 126. The ferrule and ferrule hub define a coaxial fiber bore or passage 125 in which an optical fiber is affixed. An optical connection is made between an optical fiber affixed in the ferrule 122 and another optical fiber (typically affixed to another ferrule) via the end face 126. Such an optical connection can occur via an adapter that, e.g., receives first and second connectors 100 that face each other and connect at each other's ferrule end faces.

The ferrule 122 is axially biased forwardly by the spring 112, and the spring 112 is captured between a spring seat defined by the rear housing 110 and a rear-facing surface of the ferrule hub 124. Optionally, the ferrule hub and ferrule can be integrally formed (e.g., machined or molded) together without requiring affixing of one piece to the other piece.

When the connector 100 is fully assembled and terminating an optical fiber, the optical fiber passes axially through generally coaxial bores or passages defined by each of the boot 106, the crimp ring 108, the rear housing 110, the spring 112, the ferrule hub 124, the ferrule 122, the front housing 116, and the gripping member 118.

The ferrule hub 124 includes one or more (in this example, two) locking features or anti-rotation shoulders 128 which are adapted to lock into geometrically complementary locking features or slots 130 defined by the rear housing 110. With the ferrule hub 124 locked into the rear housing 110, rotation (about the axis A), e.g., for purposes of tuning, is dictated by the rotatability of the rear housing 110. Thus, the ferrule assembly 114 rotates only when the rear housing 110 rotates. As will be described in greater detail below, when the connector is not fully assembled (i.e., when the connector is being assembled), a subassembly of the connector can be placed in rotatable and non-rotatable configurations of the rear housing 110, depending on the axial position of the rear housing 110 relative to the front housing 116 and, in some examples, also depending on the axial position of the ferrule hub 124 relative to a ferrule assembly seat defined by the front housing.

Figure 15:
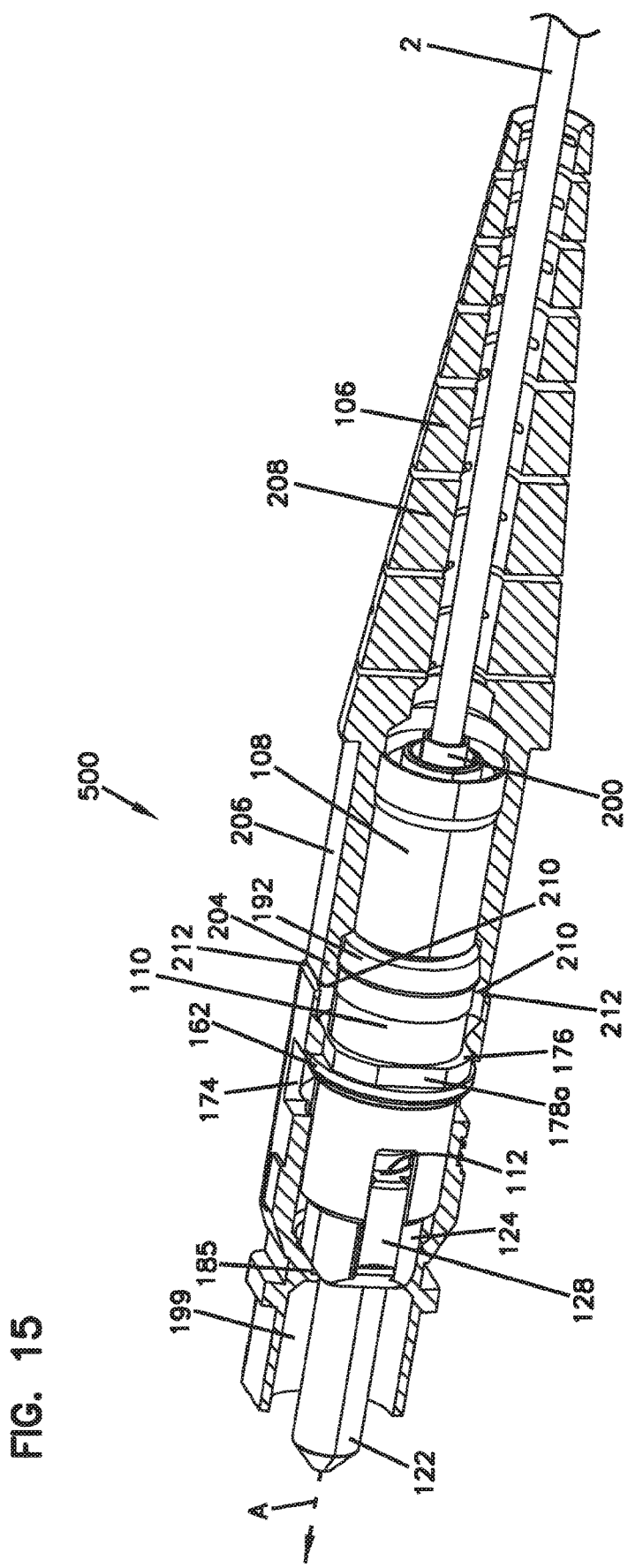
FIG. 15 is a rear perspective view of a further subassembly of a modified connector of FIG. 1 with a portion of the front housing and a portion of the boot being cut away and including a fiber optic cable that is terminated at the connector.
Figure 16:
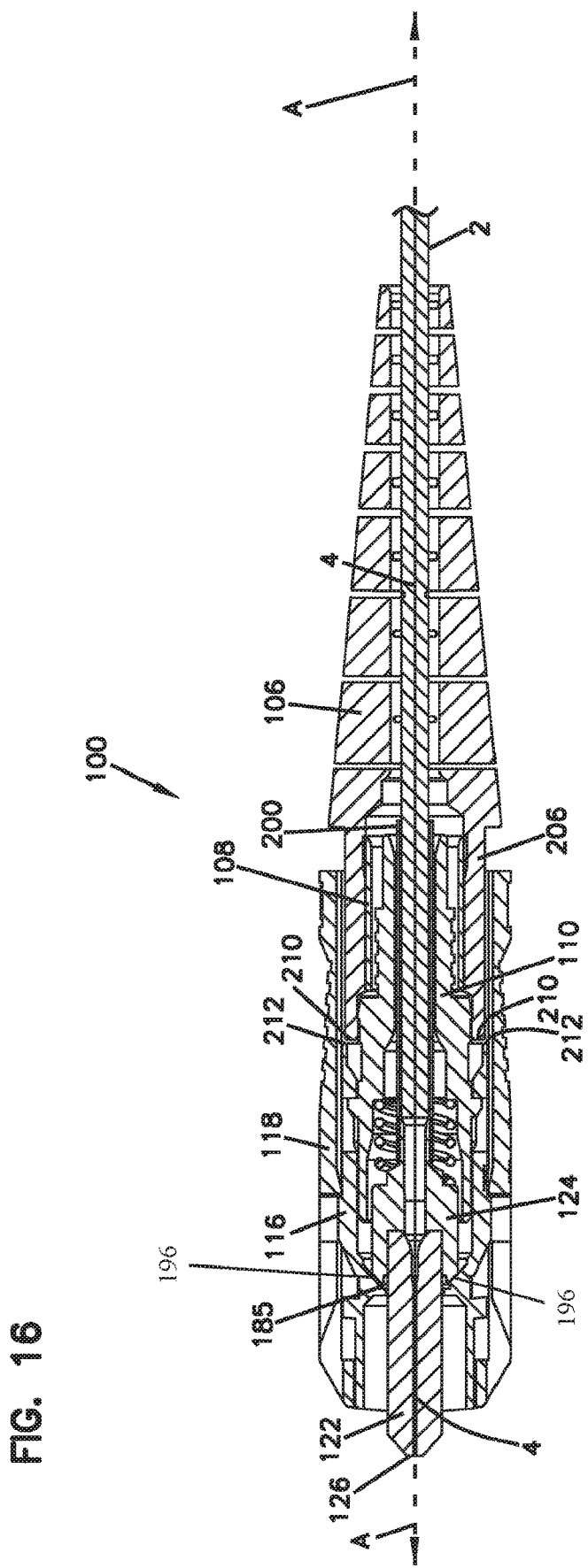
FIG. 16 is an axial cross-sectional view of a modified fully assembled connector of FIG. 2 and including a fiber optic cable that is terminated at the connector.

Optionally, the ferrule hub 124 can include a rearwardly elongated cylindrical portion 132 that can be adapted to mount, e.g., a tube 200 (see FIGS. 15 and 16). For example, the tube 200 can mount to the cylindrical portion 132 via a snap fit or interference fit with an annular lip 134 of the cylindrical portion 132. The tube 200 can function to prevent the egress of, e.g., adhesive material, used to fix the fiber to the ferrule 122 into other areas or onto other components of the connector 100.

When assembling the connector 100, prior to placement of the boot 106 at the rear of the connector, the crimp ring 108 or other crimping component can be crimped (e.g., mechanically or thermally) onto the cable 2 to secure an axial position of the cable 2 relative to the connector 100. In some examples, the crimp ring 108 is crimped onto an outer jacket of the cable 2.

The gripping member 118 extends axially from a front 147 to a back 149 and includes a protruding key 140 protruding from an externally facing side. The key 140 can be used to properly align the optical fiber of the connector 100 when connecting that fiber to another fiber. Thus, for example, the radial positioning of the key 140 relative to the ferrule 122 can correspond to an eccentricity of the fiber relative to the center of the fiber bore 125 of the ferrule 122. This allows the optical fiber to be connected to another optical fiber with aligned or approximately aligned eccentricities, thereby reducing signal loss at the connection.

In the example connector 100, the gripping member 118 includes one or more keying features 142, e.g., beveled or rounded corners, that are geometrically complementary to keying surfaces 144 of the front housing 116. This ensures that the front housing 116 can be received in the gripping member 118 in only one orientation. Therefore, as will be described in more detail below, the ferrule assembly can be tuned such that any eccentricity of the fiber is positioned towards the side 146 of the front housing 116 that corresponds to the key 140 of the gripping member 118 when the front housing 116 and the gripping member 118 are assembled together.

When the connector 100 is assembled, the gripping member 118 is configured to axially slide relative to the front housing 116. In so doing, latching and release features on the gripping member 118 (such as the windows 141 and slopes 143, 145) can cooperate with latching and release features on the exterior of the front housing 116 (such as the shoulders 160) to provide for latching and releasing of the connector 100 with respect to a receptacle having complementary latching and releasing features, e.g., a fiber optic adapter.

The rear housing 110 extends axially from a front 150 to a back 152 and defines an axially extending bore 154 that is open at both the front and the back. The front housing 116 extends axially from a front 117 to a back 119 and defines an axially extending bore 121 that is open at both the front and the back.

A generally tubular forward section 156 of the rear housing 110 includes the slots 130 and is adapted to receive the spring 112 and the ferrule assembly 114. The forward section 156 includes a forward facing surface 158 that acts as a spring seat and abuts the back of the spring 112.

An annular stopping flange 162 prevents axial movement of the rear housing 110 relative to the front housing 116 by being captured between a rearward facing forward-most surface 170 and a forward facing rearward-most surface 172, respectively, of a tuning chamber 174 of the front housing 116. The surface 170 can engage the stopping flange 162 to prevent further forward movement of the rear housing 110, and the surface 172 can engage the stopping flange 162 to prevent further rearward movement of the rear housing 110.

Rearward of the stopping flange 162 on the rear housing 110 is a tuning mechanism 176. In some examples, the tuning mechanism 176 is immediately adjacent the stopping flange 162.

The tuning mechanism 176 includes at least one first portion or keying element 178 and at least one second portion 180, the second portion extending radially farther (relative to the axis A) than the first portion 178. In this example, the tuning mechanism includes four keying elements 178 with radially shorter portions or flats that circumferentially alternate with four radially longer portions or corners 180. The corners 180 act as anti-rotation (about the axis A) features that prevent rotation of the tuning mechanism 176 (and, consequently, the rear housing 110) relative to the front housing 116 when the stopping flange 162 is abutting the rearward extreme 172 of the front housing 116 and the tuning mechanism 176 is disposed in the anti-rotation region 182 of the front housing 116, the anti-rotation region 182 being defined by one or more inwardly (towards the axis A) protrusions 184.

In particular, when the tuning mechanism 176 is within the anti-rotation region 182, attempted rotation of the rear housing 110 about the axis A causes mechanical interference between one or more of the radially longer portions 180 and one or more of the protrusions 184, thereby preventing rotation from occurring.

A rear section or tail 190 of the rear housing 110 has an outer surface that includes an axially sloped or beveled annular projection 192 adapted to snappingly receive and thereby hold the boot 106. In addition, a plurality of annular ribs 194 can enhance the gripping of the crimp ring 108 to the rear housing 110.

As described above, the front housing 116 includes an anti-rotation region 182 and a tuning chamber 174 forward of the anti-rotation region 182. In addition, in this example, forward of the tuning chamber 174, beveled surfaces 196 (angled to forwardly approach the central axis) and/or corner projections 189 of the front housing 116 define(s) a ferrule assembly seat 185. The ferrule assembly seat 185 and, particularly, one or more of the corner projections 189 and/or the beveled surfaces 196 is/are adapted to abut the ferrule hub 124 when the ferrule assembly is in its forward most position relative to the front housing 116.

Optionally, the ferrule assembly seat 185 (i.e., one or more of the beveled surfaces 196 and corner projections 189) abuts the ferrule hub 124 in the ferrule hub's forward most position such that the ferrule hub 124 (and consequently the ferrule assembly 114 and the rear housing 110) cannot rotate about the axis A when the ferrule hub 124 abuts the ferrule assembly seat 185. In those examples, pushing the front of the ferrule hub 124 sufficiently rearwards of the ferrule assembly seat 185 (i.e., disengaging the ferrule hub from the ferrule assembly seat and sufficiently distancing them from each other) such that the front of the ferrule hub 124 moves sufficiently rearwards in the region 187 defined by the beveled surfaces 196, can allow the ferrule assembly to be rotated if, at the same time, the tuning mechanism 176 is positioned within the tuning chamber 174. If the ferrule hub is not slid/pushed sufficiently rearwards, mechanical interference between the ferrule hub and the beveled surfaces 196 of the ferrule assembly seat can prevent rotation from occurring.

In other examples, the ferrule assembly seat is merely one or more surfaces that the ferrule hub abuts forwardly, and the ferrule assembly seat does not prevent rotation of the ferrule assembly when the ferrule hub abuts the seat. In these examples it is not necessary to push the ferrule assembly rearwards in order to rotate the ferrule assembly about the central axis.

Figure 11:
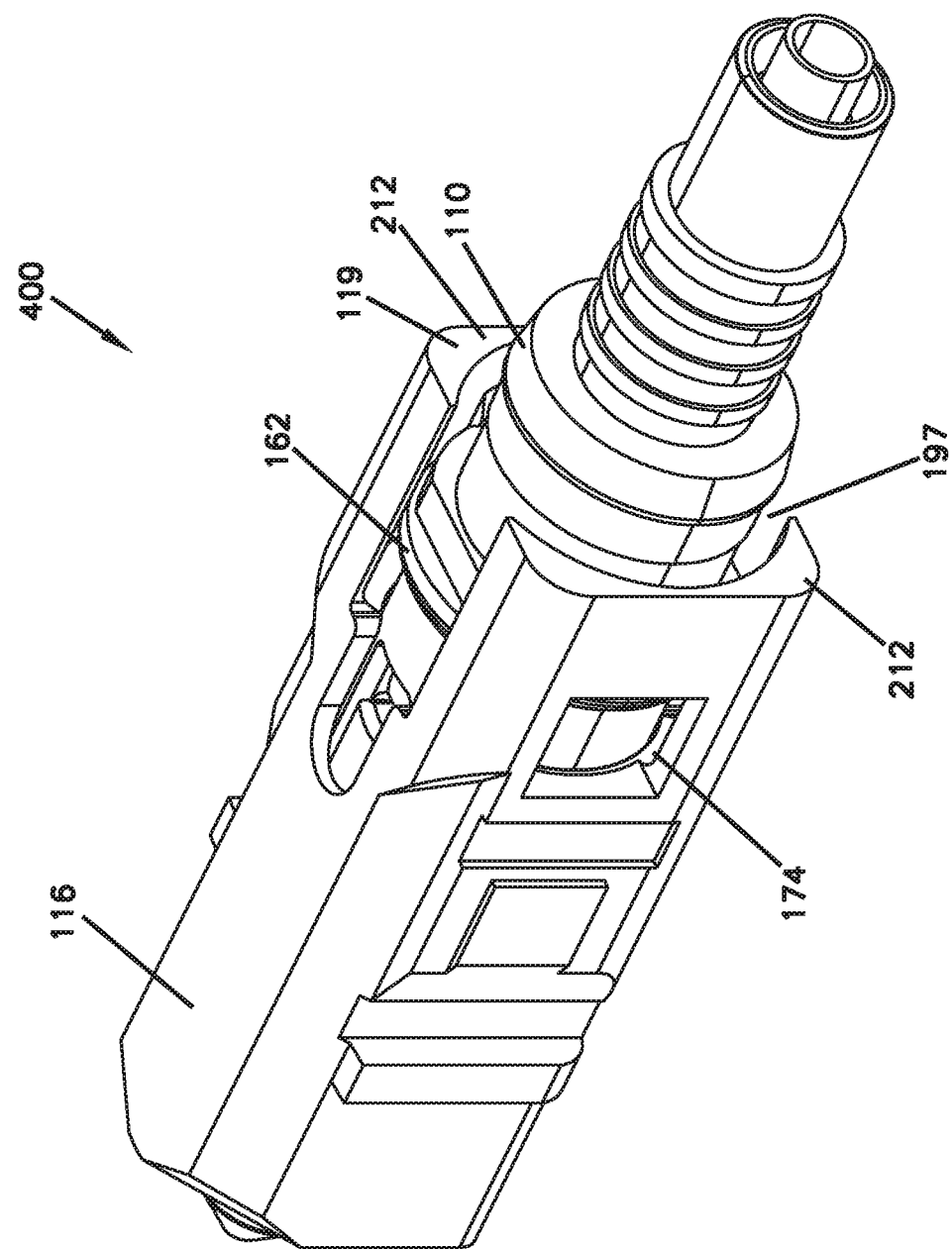
FIG. 11 is a rear perspective view of a subassembly of the connector of FIG. 1.

Referring now to FIG. 11, a subassembly 400 of the connector 100 includes the rear housing 110, the spring, the ferrule assembly, and the front housing 116 all assembled together. In one non-limiting example, the subassembly 400 is assembled by inserting the spring 112 (FIG. 1) rearwardly into the spring seat defined by the rear housing 110; coupling the ferrule assembly 114 (FIG. 1) to the rear housing 110 such that the anti-rotation shoulders 128 nest in the slots 130 thereby forming a rear housing-ferrule subassembly; and inserting the rear housing-ferrule subassembly into the front housing 116 from the rear 119 of the front housing 116 until the annular stopping flange 162 clears protrusions 184 (FIG. 8) and becomes axially captured within the tuning chamber 174. At this point, the ferrule 122 is received within a plug section 199 of the front housing 116 (FIGS. 8 and 12) and the ferrule assembly abuts the ferrule assembly seat defined by the front housing 116.

Ramps 195 (FIG. 8) leading to the protrusions 184 can assist in allowing the stopping flange 162 to clear the protrusions 184 as the rear housing 110 is pushed forwards into the front housing 116. One or more axially extending voids 197 (FIGS. 7, 11) in the front housing 116 can allow the front housing 116 to resiliently flex enough to allow the stopping flange 162 to clear the protrusions 184 during the assembly process.

Figure 12:
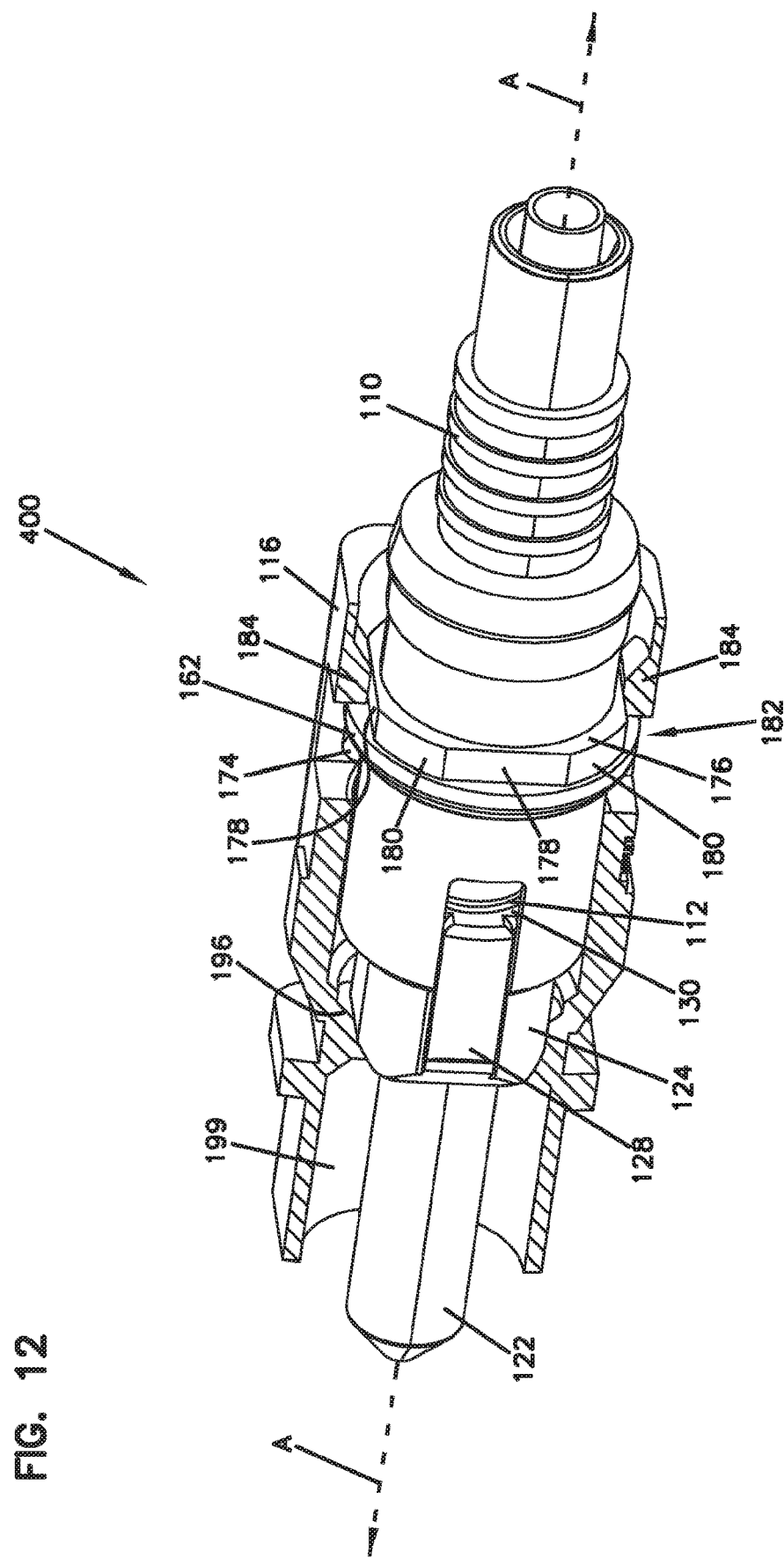
FIG. 12 is a rear perspective view of the subassembly of FIG. 11 with a portion of the front housing of the subassembly cut away and the rear housing and the front housing being in a rotationally fixed or non-tunable configuration.

Referring now to FIG. 12, the subassembly 400 is shown with a portion of the front housing 116 cut away for ease of illustration.

In FIG. 12 the rear housing 110 and the front housing 116 are in a rotationally fixed or non-tunable configuration. Specifically, the annular stopping flange 162 is towards the back of the tuning chamber 174 and, in this example, abutting forward facing surfaces of the protrusions 184. The tuning mechanism 176 is therefore positioned within the anti-rotation region 182 of the front housing 116. With this positioning, any attempted rotation of the rear housing 110 about the axis A is prevented by interference between one of the radially longer portions 180 of the tuning mechanism 176 and a protrusion 184.

In addition, in this configuration the spring 112 pushes the ferrule up against the beveled surfaces 196 (see also FIG. 8) of the front housing 116, the beveled surfaces 196 being behind the plug section 199. In addition, in this example the front the ferrule hub of the ferrule assembly 114 abuts the ferrule assembly seat defined by the beveled surfaces 196 and/or the corner projections 189 of the front housing while the anti-rotation shoulders 128 are still partially nested within the slots 130, the abutting of the ferrule hub and the ferrule assembly seat thereby providing a second constraint against attempted rotation of the rear housing 110 about the axis A.

Because the rear housing 110 and the ferrule assembly 114 remain coupled in this way, the inability to rotate the rear housing 110 when the subassembly 400 is in a rotationally fixed or non-tunable configuration translates to the ferrule assembly and vice versa, effectively preventing tuning, re-tuning, or detuning of the ferrule 122 when the subassembly 400 is in a rotationally fixed/non-tunable configuration, i.e., when the tuning mechanism 176 is positioned within the anti-rotation region 174 and/or the ferrule assembly 114 abuts the ferrule assembly seat defined by the front housing.

Figure 13:
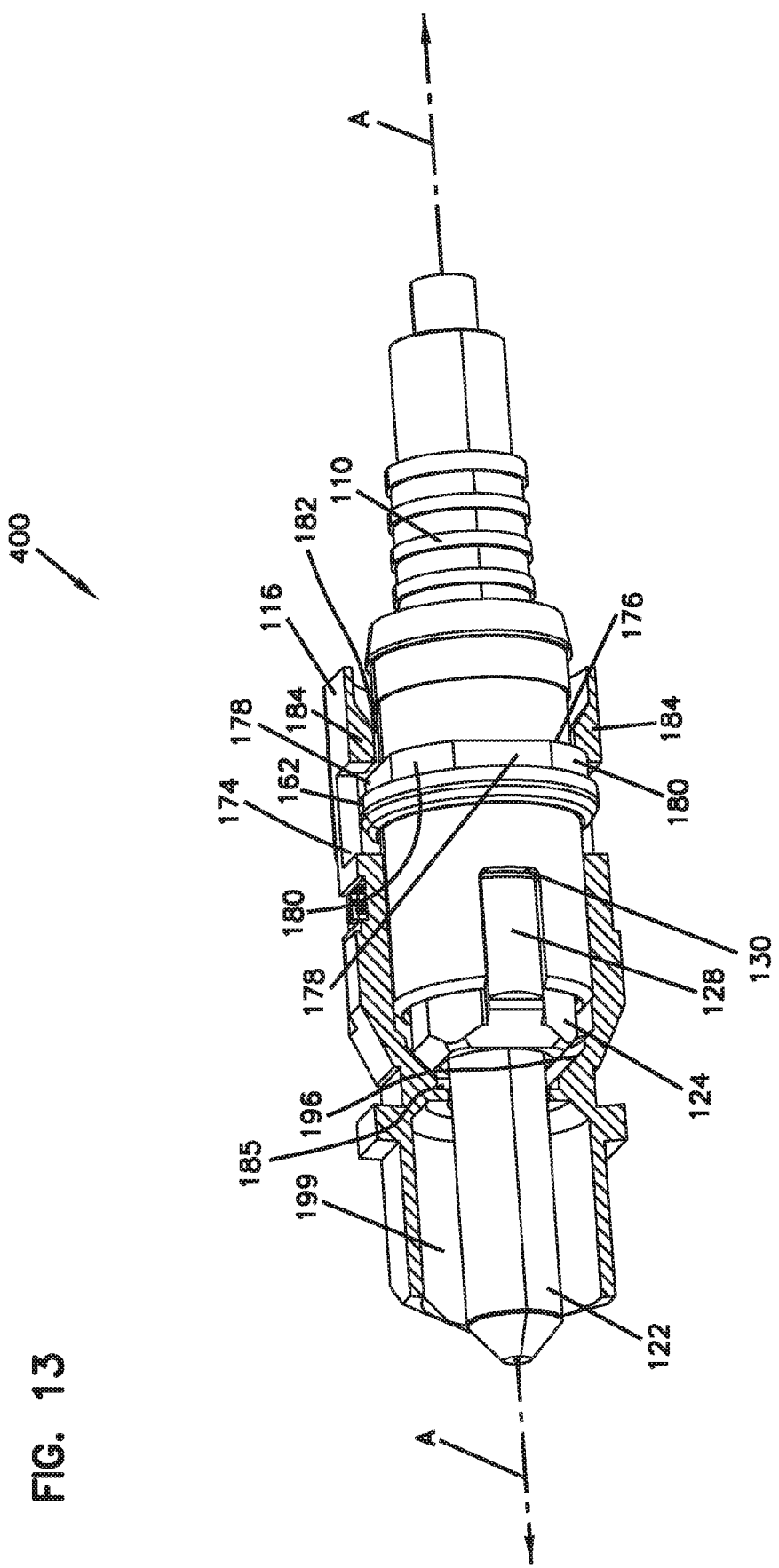
FIG. 13 is a further rear perspective view of the subassembly of FIG. 11 with a portion of the front housing of the subassembly cut away and the rear housing and the front housing being in a first position in a tunable configuration.

Referring now to FIG. 13, the subassembly of FIG. 400 is again shown with a portion of the front housing 116 cut away for ease of illustration.

In FIG. 13, the subassembly 400 is in a rotatable or tunable configuration. In the tunable configuration shown in FIG. 13, the rear housing 110 has been pushed axially forward relative to the front housing 116, against the spring bias, and such that the tuning mechanism 176 has forwardly cleared the anti-rotation region 182 and is disposed within the tuning chamber 174. In addition, the ferrule assembly 114 has been pushed axially rearwards relative to the front housing 116, also against the spring bias, and such that ferrule hub 124 has rearwardly disengaged and rotationally cleared the ferrule assembly seat.

When the tuning mechanism 176 is in the tuning chamber 174, the tuning mechanism 176 can be rotated freely about the axis A, i.e., no portion of the front housing 116 interferes with the rotation. In addition, in this tunable configuration, the spring has been axially compressed such that the anti-rotation shoulders 128 of the ferrule hub 124 fill or substantially fill the slots 130.

The number of keying elements 178 of the tuning mechanism 176 dictates the number of different available tuning positions for the ferrule 122. In this example, the tuning mechanism 176 includes four flats 178 equally spaced circumferentially about the axis A. Thus, in this example, the ferrule 122, which rotates via the engagement of the ferrule hub 124 to the rear housing 110, can be tuned to one of four positions corresponding to one of the four keying elements 178. It should be appreciated that the tuning mechanism can be provided with any number (e.g., 1, 2, 3, 4, 5, 6, 7, 8, 9, 10, 11, 12, or more) and circumferential positioning (e.g., equally spaced and/or not equally spaced) of keying elements.

Once the ferrule 122 has been tuned, i.e., the keying element 178 corresponding to fiber eccentricity has been radially aligned with the outer face 146 (FIG. 1) of the front housing 116, which corresponds to the side of the front housing 116 that ultimately will be radially aligned with the key 140 of the gripping member 118 (FIG. 4; this will occur when the connector 100 is fully assembled), the rear housing 110 and the ferrule assembly 114 are released, allowing the spring 112 to push the rear housing backwards and the ferrule assembly forwards into the rotationally fixed or non-tunable configuration of FIG. 12, in which the tuning mechanism 176 is once again disposed within the anti-rotation region 182 of the front housing 116 and the ferrule hub 124 non-rotationally abuts the ferrule assembly seat.

Figure 14:
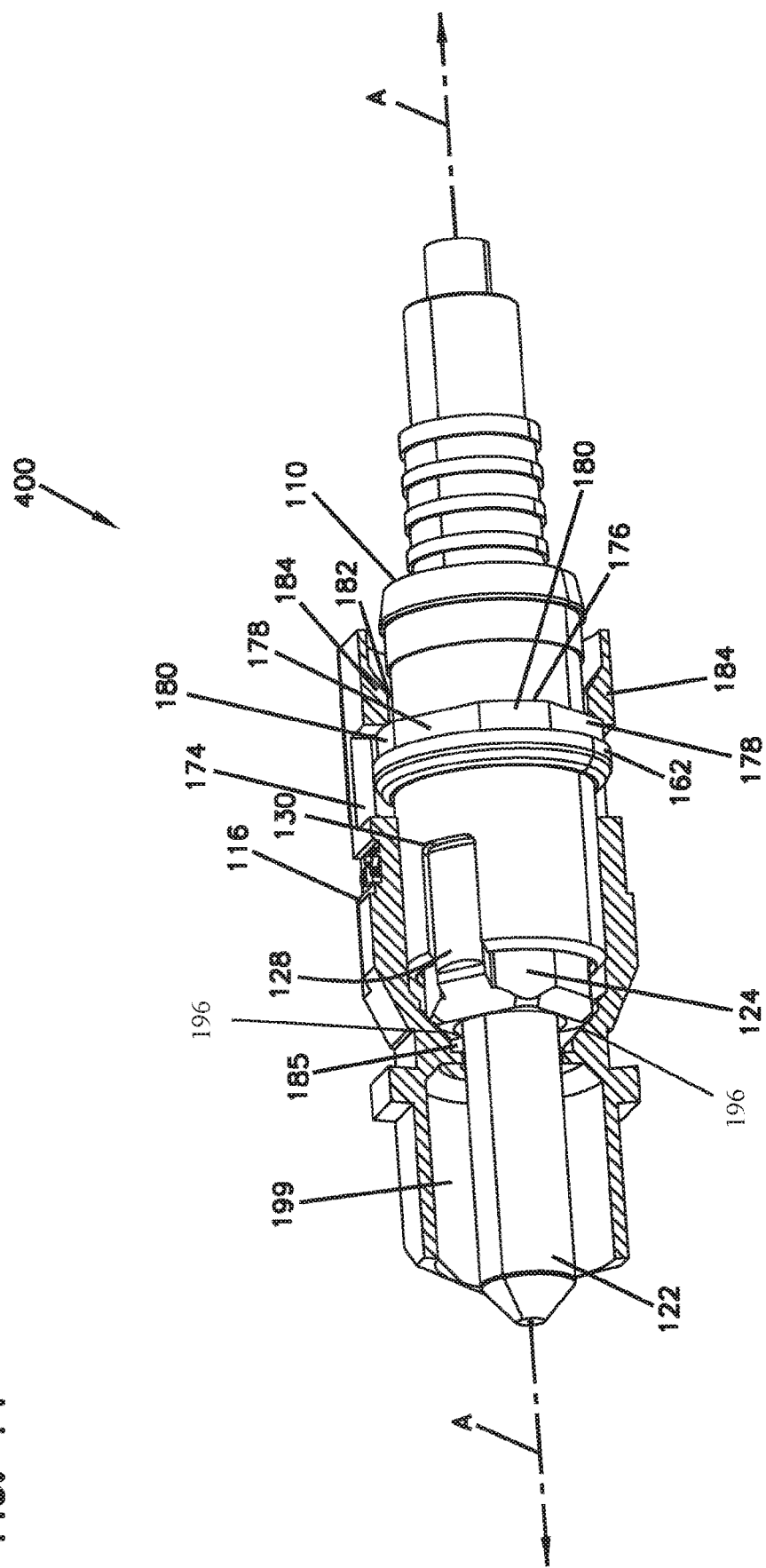
FIG. 14 is a further rear perspective view of the subassembly of FIG. 11 with a portion of the front housing of the subassembly cut away and the rear housing and the front housing being in a second position in a tunable configuration.

Referring now to FIG. 14, the subassembly 400 is still in the tunable configuration; however, the rear housing 110 (and ferrule assembly) has been rotated (relative to the position in FIG. 13) about the axis A to a position that is between two tuning positions. Thus, in this particular example, the rear housing 110 has been rotated about 45° or a multiple of 45° relative to the position in FIG. 13.

As depicted in FIG. 14, the subassembly 400 is between two tuning positions because none of the keying elements 178 is radially aligned with the surface 146 (FIG. 1) of the front housing 116, which corresponds to the side of the front housing 116 that ultimately will be radially aligned with the key 140 of the gripping member 118 (FIG. 4) when the connector 100 is fully assembled.

The subassembly 400 is designed to prevent the subassembly 400 from returning to the non-tunable configuration of FIG. 12 when the subassembly is between predefined tuning positions. In particular, when the tuning mechanism 176 of the subassembly 400 is between tuning positions (as in FIG. 14), one or more of the corners 180 of the tuning mechanism 176 interfere with forward facing surfaces of the protrusions 184, preventing the rear housing 110 from returning (rearwards) to the non-tunable configuration in which the tuning mechanism is disposed within the anti-rotation region 182. Similarly, the transverse profile of the front of the ferrule hub 124 can prevent return of the ferrule hub to the ferrule assembly seat when the ferrule assembly is not in a predetermined tuning position. In order for the rear housing 110 to be allowed to return to the non-tunable configuration and for the ferrule assembly to reengage the ferrule assembly seat, one of the keying elements must be properly aligned in one of the predetermined tuning positions of the subassembly 400.

Referring now to FIG. 15, a further subassembly 500 is shown. The subassembly 400 includes the rear housing 110, the front housing 116, and the ferrule assembly 114 in a non-tunable configuration (as in FIG. 12). In addition, the assembly 500 includes the crimp ring 108, the tube 200, and the boot 106. In addition, an optical cable 2 is terminated in the subassembly 500.

In the configuration shown in FIG. 15, the optical fiber in the cable 2 has been tuned, the fiber having an eccentricity corresponding to the keying element 178a. Once tuned, the rear housing 110 has been returned to its non-tunable position by the axial bias of the spring 112. The crimp ring 108 has been used to crimp the cable 2 to the rear housing 110, though in FIG. 15 the crimp ring is shown in an un-crimped configuration for ease of illustration. Once the cable 2 has been crimped, in the FIG. 15 configuration the boot 106 has been slid forwards along the cable 2 and over the tail of the rear housing 110 until an annular barb 204 on the inner surface of a rear housing engaging portion 206 of the boot 106 has snapped over and forward of the beveled annular projection 192 of the rear housing 110, thereby affixing the boot 106 to the rear housing 110.

The rear housing engaging portion 206 of the boot 106 extends forwardly from a flexible tail portion 208, the flexible tail portion 208 housing a portion of the cable 2 and being adapted to reduce lateral strain on the cable 2 and reduce over-bending of the cable 2.

Once the subassembly 500 has been complete, as shown in FIG. 16 the gripping member 118 can be slid over the front housing 116 from the front of the subassembly 500 until complementary latching features on the gripping member 118 and front housing 116 cooperate with each other such that the gripping member 118 and the front housing 116 are operably coupled. The fully assembled connector 100 of FIG. 16 is identical to the fully assembled connector 100 of FIG. 2 except that connector 100 of FIG. 16 also includes the tube 200.

As shown in FIG. 16, the cable 2 holds an optical fiber 4 that terminates approximately at the end face 126 of the ferrule 122.

As shown in FIGS. 15 and 16, the relative radial dimensions of the front housing 116 and the rear housing engaging portion 206 of the boot 106 are such that, once the barb 204 has been snapped over the projection 192, forward movement of the boot 106 causes a forward facing wall 201 of the rear housing engaging portion 206 to contact a rear facing wall 212 at the rear end of the front housing 116. This interference between the boot 106 and the front housing 116, as well as the radial enclosing of the tail of the rear housing 110 by the rear housing engaging portion 206 prevents access to the rear housing 110 in the subassembly 500 (FIG. 15) and also in the fully assembled connector 100 (FIG. 16). Thus, the boot 106 prevents a tuned subassembly from being displaced back into a tunable configuration that could potentially and undesirably cause the ferrule to become de-tuned. The boot 106, therefore, functions as a retuning or de-tuning prevention mechanism by preventing the tuning mechanism 176 from being pushed forwards into the tuning chamber 174.

Methods of assembling and tuning a fiber optic connector in accordance with the present disclosure will now be described.

Figure 17:
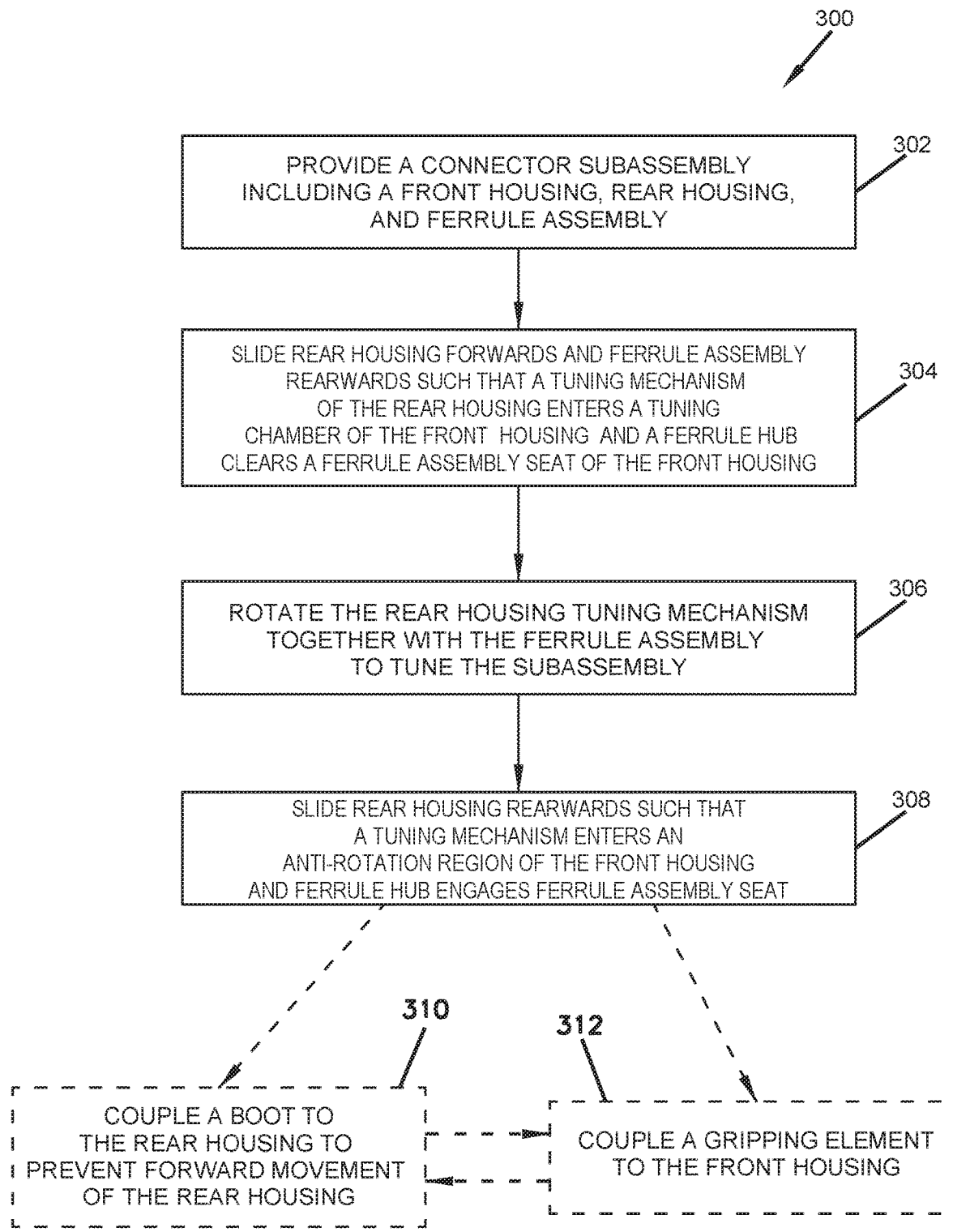
FIG. 17 is a flow diagram illustrating an example method of tuning a fiber optic connector in accordance with the present disclosure.
Figure 18:
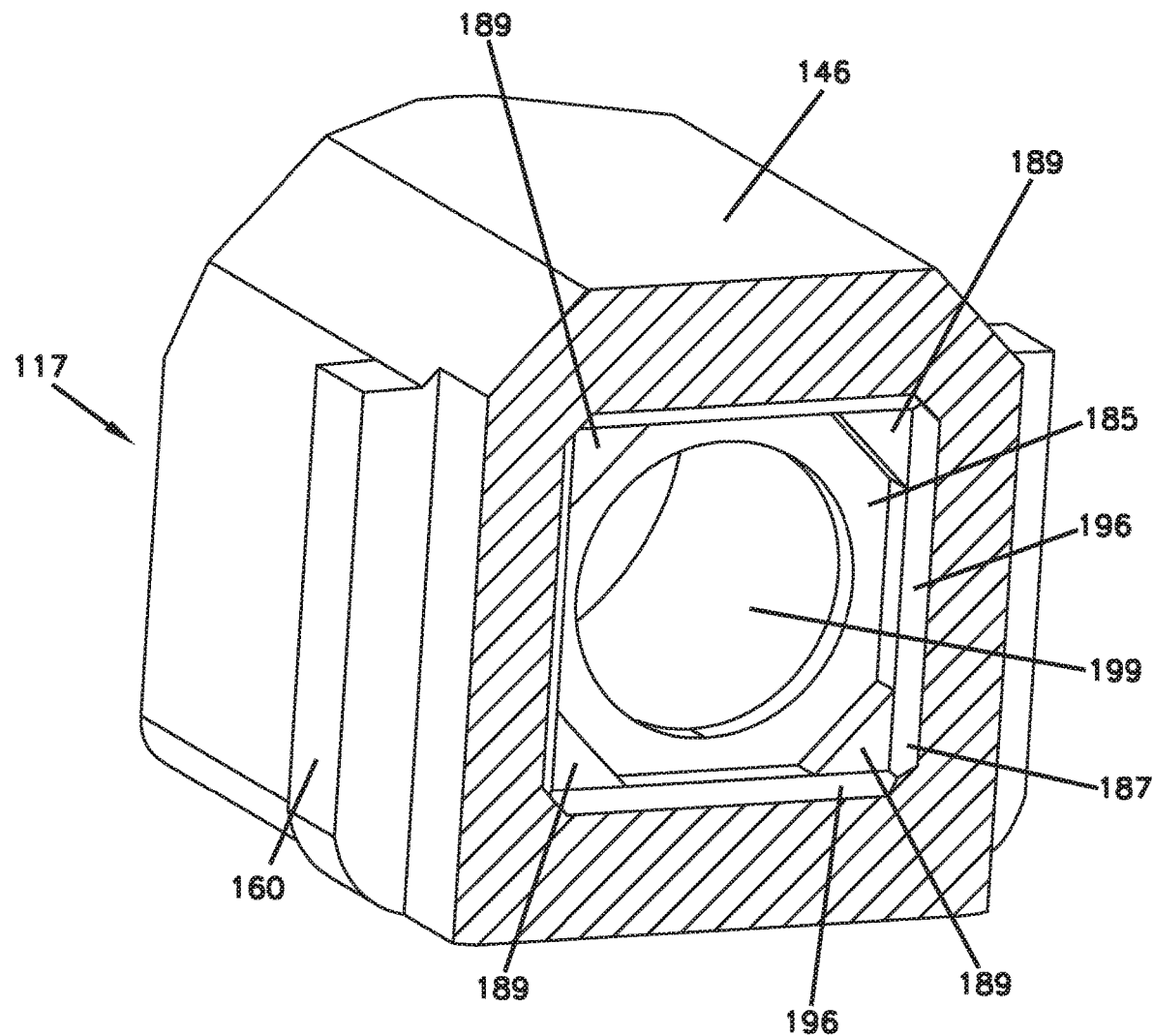
FIG. 18 is a perspective cross-sectional view of the front housing of FIG. 7 taken through the lines 18-18 in FIG. 7.

Referring now to FIG. 17, an example method 300 includes a step 302 of providing a first connector subassembly, the first connector subassembly extending axially from a front end to a back end and including a rear housing slidingly disposed within a front housing and being rotationally coupled with a ferrule assembly including a ferrule and a ferrule hub; a step 304 of sliding the rear housing forwards such that a tuning mechanism of the rear housing moves from an anti-rotation region defined by the front housing into a tuning chamber defined by the front housing and, optionally, sliding the ferrule assembly rearwards such that the ferrule hub disengages and rotationally clears a ferrule assembly seat of the front housing; a step 306 of rotating the rear housing in the tuning chamber to radially align, to a first orientation, one of a plurality of keying elements of the tuning mechanism corresponding to an eccentricity of a fiber relative to a bore of the ferrule; and a step 308 of sliding the rear housing rearwards such that the tuning mechanism returns to the anti-rotation region and, optionally, sliding the ferrule assembly forwards such that the ferrule hub reengages the ferrule assembly seat.

In step 304, the sliding of the rear housing and the optional sliding of the ferrule assembly can be performed simultaneously, or performed successively in either order, provided that when performing step 306, the rear housing is in a slid forward position and, if necessary to rotate the ferrule assembly the ferrule assembly is in a slid backward position.

In step 308, the sliding of the rear housing and the optional sliding of the ferrule assembly can be performed simultaneously, or performed successively in either order.

Optionally the methods can also include a step 310 of coupling a boot to a tail portion of the rear housing to provide a second subassembly and such that forward movement of the rear housing is prevented by the boot and/or a rear housing engaging portion of the boot.

Optionally the methods can also include a step 312 of operably coupling a gripping element to the front housing such that a key protruding from an outer surface of the gripping element is radially aligned with the first orientation.

Optionally, a spring is axially compressed between the ferrule hub and the rear housing, such that the sliding the rear housing forwards and the ferrule assembly rearwards are against an axial biasing force of the spring, and such that the sliding the rear housing rearwards and the ferrule assembly forwards are performed by an axial decompression of the spring.

Optionally, the methods can also including crimping, e.g., with a crimp ring, a fiber optic cable carrying an optical fiber to the rear housing before coupling a boot to the rear housing.

Optionally, the rear housing includes an annular stopping flange that defines a forward most position of the rear housing in the first subassembly when the annular stopping flange engages a front of the tuning chamber, and that defines a rearward most position of the rear housing in the first subassembly when the annular stopping flange engages a rear of the tuning chamber.

Example Embodiments

According to a $1^{st}$ example embodiment there is a provided a kit for assembling a fiber optic connector extending along a central axis from a front end to a back end, the kit comprising: a front housing defining an anti-rotation region, a tuning chamber disposed forwards of the anti-rotation region; a rear housing operably couplable to the front housing and including a tuning mechanism; and a ferrule assembly having a ferrule and a ferrule hub and being rotationally couplable to the rear housing about the central axis.

According to a $2^{nd}$ example embodiment there is provided the $1^{st}$ example embodiment, wherein the front housing further defines a ferrule assembly seat disposed forwards of the tuning chamber.

According to a $3^{nd}$ example embodiment there is provided any of the $1^{st}$ or $2^{nd}$ example embodiments, further comprising an optical fiber affixed to an axial bore of the ferrule.

According to a $4^{th}$ example embodiment there is provided any of the $1^{st}$ through $3^{nd}$ example embodiments, further comprising a spring axially positionable between the rear housing and the ferrule hub.

According to a $5^{th}$ example embodiment there is provided any of the $1^{st}$ through $4^{th}$ example embodiments, further comprising a gripping member couplable to the front housing in a keyed orientation.

According to a $6^{th}$ example embodiment there is provided any of the $1^{st}$ through $5^{th}$ example embodiments, further comprising a crimping ring for crimping an optical cable to the rear housing.

According to a $7^{th}$ example embodiment there is provided any of the $1^{st}$ through $6^{th}$ example embodiments, further comprising a strain relief boot couplable to the rear housing to prevent access to the rear housing.

According to an $8^{th}$ example embodiment there is provided any of the $1^{st}$ through $7^{th}$ example embodiments, wherein the tuning mechanism comprises a plurality of keying elements each corresponding to one of a plurality of pre-defined eccentricities of an optical fiber affixed to the ferrule.

According to a $9^{th}$ example embodiment there is provided the $8^{th}$ example embodiment, wherein each of the keying elements comprises a flat, and wherein the tuning mechanism further comprises anti-rotation features that circumferentially alternate with the keying elements.

According to a $10^{th}$ example embodiment there is provided the $9^{th}$ example embodiment, wherein each of the anti-rotation features extends radially farther from the central axis than all of the keying elements.

According to an $11^{th}$ example embodiment there is provided the $10^{th}$ example embodiment, wherein each of the anti-rotation features comprises a rounded corner, and wherein the tuning mechanism comprises at least four of the rounded corners and at least four of the flats.

According to a $12^{th}$ example embodiment there is provided any of the $1^{st}$ through $11^{th}$ example embodiments, wherein the rear housing includes a stopping flange positioned forwards of the tuning mechanism.

According to a $13^{th}$ example embodiment there is provided any of the $1^{st}$ through $12^{th}$ example embodiments, wherein the ferrule hub includes one or more anti-rotation shoulders adapted to cooperate with one or more slots in the rear housing for rotationally coupling the ferrule assembly and the rear housing.

According to a $14^{th}$ example embodiment there is provided any of the $1^{st}$ through $13^{th}$ example embodiments, wherein the anti-rotation region includes one or more protrusions projecting towards the central axis, the one or more protrusions being adapted to mechanically interfere with the tuning mechanism.

According to a 15$^{th}$ example embodiment, there is provided a method of tuning a fiber optic connector, comprising: providing a first connector subassembly, the first connector subassembly extending axially from a front end to a rear end and including a rear housing slidingly disposed within a front housing and being rotationally coupled with a ferrule assembly; sliding the rear housing forwards such that a tuning mechanism of the rear housing moves from an anti-rotation region defined by the front housing into a tuning chamber defined by the front housing; sliding the ferrule assembly rearwards such that ferrule hub of the ferrule assembly disengages a ferrule assembly seat defined by the front housing; rotating the rear housing in the tuning chamber to radially align, to a first radial orientation, one of a plurality of keying elements of the tuning mechanism corresponding to an eccentricity of an optical fiber relative to a bore of the ferrule; sliding the rear housing rearwards such that the tuning mechanism returns to the anti-rotation region; and sliding the ferrule assembly forwards such that the ferrule hub re-engages the ferrule assembly seat.

According to a 16$^{th}$ example embodiment, there is provided the 15$^{th}$ example embodiment, wherein the sliding the rear housing forwards and the sliding the ferrule assembly rearwards are performed simultaneously or successively, and wherein the rotating is performed when the rear housing is in a slid forward position and the ferrule assembly is in a slid rearward position.

According to a 17$^{th}$ example embodiment there is provided any of the 15$^{th}$ or 16$^{th}$ example embodiments, wherein the sliding the rear housing rearwards and the sliding the ferrule assembly forwards are performed simultaneously or successively.

According to an 18$^{th}$ example embodiment there is provided any of the 15$^{th}$ through 17$^{th}$ example embodiments, wherein the ferrule assembly comprises a ferrule and a ferrule hub, and wherein the ferrule hub includes one or more anti-rotation shoulders that rotationally cooperate with one or more slots of the rear housing.

According to a 19$^{th}$ example embodiment there is provided any of the 15$^{th}$ through 18$^{th}$ example embodiments, further comprising coupling a boot to a tail portion of the rear housing to provide a second subassembly and such that forward sliding of the rear housing is prevented by the boot.

According to a 20$^{th}$ example embodiment there is provided any of the 15$^{th}$ through b 19$^{th}$ example embodiments, further comprising coupling a gripping element to the front housing such that a key protruding from an outer surface of the gripping element is radially aligned with the first radial orientation.

According to a 21$^{st}$ example embodiment there is provided any of the 15$^{th}$ through 20$^{th}$ example embodiments, wherein a spring is axially compressed between the ferrule hub and the rear housing, such that the sliding the rear housing forwards and the sliding the ferrule assembly rearwards are against an axial biasing force of the spring, and such that the sliding the rear housing rearwards and the sliding the ferrule assembly forwards are performed by an axial decompression of the spring.

According to a 22$^{nd}$ example embodiment there is provided any of the 15$^{th}$ through 18$^{th}$ example embodiments, further comprising crimping, e.g., with a crimp ring, a fiber optic cable carrying the optical fiber to the rear housing before coupling a boot to the rear housing.

According to a 23$^{rd}$ example embodiment there is provided any of the 15$^{th}$ through 22$^{nd}$ example embodiments wherein, the rear housing includes a stopping flange that defines a forward most position of the rear housing in the first subassembly when the stopping flange engages a front of the tuning chamber, and that defines a rearward most position of the rear housing in the first subassembly when the stopping flange engages a rear of the tuning chamber.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fiber optic connector assembly comprising:
a subassembly extending along a central axis from a front end to a back end of the subassembly, the subassembly having a tunable configuration and a non-tunable configuration and including:
a front housing defining an anti-rotation region, a tuning chamber disposed forwards of the anti-rotation region, and a ferrule assembly seat;
a rear housing operably coupled to the front housing and including a tuning mechanism; and
a ferrule assembly rotationally coupled to the rear housing about the central axis;
wherein when the subassembly is in the non-tunable configuration the tuning mechanism is positioned within the anti-rotation region, and
wherein when the subassembly is in the tunable configuration the tuning mechanism is positioned within the tuning chamber.

2. The fiber optic connector assembly of claim 1, wherein in the non-tunable configuration the ferrule assembly abuts the ferrule assembly seat.

3. The fiber optic connector assembly of claim 2, wherein in the tunable configuration the ferrule assembly does not abut the ferrule assembly seat.

4. The fiber optic connector assembly of claim 1, further comprising a strain-relief boot coupled to the rear housing, wherein the strain-relief boot is adapted to prevent axial movement of the tuning mechanism from the anti-rotation region to the tuning chamber when the subassembly is in the non-tunable configuration.

5. The fiber optic connector assembly of claim 1, wherein the tuning mechanism comprises a plurality of keying elements each corresponding to one of a plurality of predefined eccentricities of an optical fiber terminated at the subassembly.

6. The fiber optic connector assembly of claim 5, wherein each of the keying elements comprises a flat, and wherein the tuning mechanism further comprises anti-rotation features that circumferentially alternate with the keying elements.

7. The fiber optic connector assembly of claim 6, wherein each of the anti-rotation features extends radially farther from the central axis than all of the keying elements.

8. The fiber optic connector assembly of claim 7, wherein each of the anti-rotation features comprises a rounded corner, and wherein the tuning mechanism comprises at least four of the rounded corners and at least four of the flats.

9. The fiber optic connector assembly of claim 5, wherein the subassembly is tuned when an eccentricity of the optical fiber is radially aligned with a first of the keying elements, and wherein the first of the keying elements is radially aligned with a pre-defined outer face of the front body.

10. The fiber optic connector assembly of claim 9, wherein the assembly further comprises a gripping member operably coupled to the front housing, the gripping member including a protruding key, and wherein the first of the keying elements is radially aligned with the protruding key.

11. The fiber optic connector assembly of claim 1, wherein the rear housing includes a stopping flange, wherein the stopping flange abuts a forward facing rear surface of the tuning chamber when the subassembly is in the non-tunable configuration, and wherein the stopping flange abuts a rearward facing front surface of the tuning chamber when the subassembly is in the tunable configuration.

12. The fiber optic connector assembly of claim 1, wherein the ferrule assembly includes a ferrule affixed to a ferrule hub, wherein the ferrule hub includes one or more anti-rotation shoulders that cooperate with one or more slots in the rear housing to rotationally couple the ferrule assembly and the rear housing.

13. The fiber optic connector assembly of claim 12, wherein the ferrule hub includes a cylindrical portion extending rearwardly to a free end, the cylindrical portion being adapted to engage a tube.

14. The fiber optic connector assembly of claim 1, further comprising an axially compressible spring captured between the ferrule assembly and the rear housing.

15. The fiber optic connector assembly of claim 14, wherein moving the tuning mechanism from the anti-rotation region to the tuning chamber axially compresses the spring, and wherein the subassembly is adapted to move the tuning mechanism from the tuning chamber to the anti-rotation region via an axial decompression of the spring, and wherein disengaging the ferrule assembly from the ferrule assembly seat axially compresses the spring.

16. The fiber optic connector assembly of claim 1,
wherein the anti-rotation region includes one or more protrusions projecting towards the central axis, the one or more protrusions being adapted to mechanically interfere with the tuning mechanism; and
wherein the one or more protrusions prevent rotation of the tuning mechanism when the tuning mechanism is positioned in the anti-rotation region, and wherein the one or more protrusions prevent entry of the tuning mechanism into the anti-rotation region when the tuning mechanism is rotationally oriented between pre-defined tuning positions.

17. A fiber optic connector extending along a central axis from a front end to a back end of the connector, the connector having a tunable configuration and a non-tunable configuration and including:
a ferrule assembly;
a front housing defining an anti-rotation region, a tuning chamber disposed forwards of the anti-rotation region, and a ferrule assembly seat disposed forwards of the tuning chamber; and
a rear housing operably coupled to the front housing and including a tuning mechanism;
wherein when the connector is in a non-tunable configuration, the tuning mechanism is positioned within the anti-rotation region and/or the ferrule assembly abuts the ferrule assembly seat; and
wherein when the connector is in the tunable configuration, the tuning mechanism is positioned within the tuning chamber and the ferrule assembly is disengaged from the ferrule assembly seat.

18. The fiber optic connector of claim 17, further comprising a strain-relief boot coupled to the rear housing, wherein the strain-relief boot is adapted to prevent axial movement of the rear housing, and wherein the strain-relief boot is adapted to prevent axial movement of the tuning mechanism from the anti-rotation region to the tuning chamber when the connector is in the non-tunable configuration.

19. The fiber optic connector claim 17, wherein the ferrule assembly includes a ferrule affixed to a ferrule hub, wherein the ferrule hub includes one or more anti-rotation shoulders that cooperate with one or more slots in the rear housing to rotationally couple the ferrule assembly and the rear housing, and wherein a front face of the of the ferrule hub is adapted to non-rotationally engage the ferrule assembly seat when the connector is in the non-tunable configuration.

20. The fiber optic connector of claim 17, further comprising an axially compressible spring captured between the ferrule assembly and the rear housing.

21. The fiber optic connector of claim 17, wherein the anti-rotation region includes one or more protrusions projecting towards the central axis, the one or more protrusions being adapted to mechanically interfere with the tuning mechanism.

22. A fiber optic connector extending along a central axis from a front end to a back end of the connector, the connector having a tunable configuration and a non-tunable configuration and including:
a ferrule assembly;
a front housing defining an anti-rotation region and a tuning chamber disposed forwards of the anti-rotation region;
a rear housing operably coupled to the front housing and including a tuning mechanism;
wherein when the connector is in a non-tunable configuration, the tuning mechanism is positioned within the anti-rotation region; and
wherein when the connector is in the tunable configuration, the tuning mechanism is positioned within the tuning chamber.

23. The fiber optic connector assembly of claim 1, further comprising an optical fiber affixed to a ferrule of the ferrule assembly, wherein the rear housing is affixed to a cable carrying the optical fiber.

24. The fiber optic connector claim 22, further comprising an optical fiber affixed to a ferrule of the ferrule assembly wherein the rear housing is affixed to a cable carrying the optical fiber.

* * * * *

UNITED STATES PATENT AND TRADEMARK OFFICE
CERTIFICATE OF CORRECTION

PATENT NO. : 11,150,412 B2  
APPLICATION NO. : 16/964745  
DATED : October 19, 2021  
INVENTOR(S) : Zimmel et al.

It is certified that error appears in the above-identified patent and that said Letters Patent is hereby corrected as shown below:

In the Claims

Column 16, Claim 19, Line 22: "face of the of the ferrule hub" should read --face of the ferrule hub--

Column 16, Claim 24, Line 55: "ferrule assembly" should read --ferrule assembly,--

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*